US012717144B2

(12) United States Patent
Takeda et al.

(10) Patent No.: US 12,717,144 B2
(45) Date of Patent: Aug. 25, 2026

(54) VIRTUAL IMAGE DISPLAY DEVICE COMPRISING A FIRST LENS AND A SECOND LENS HAVING A PLANO-CONVEX SHAPE AND FIRST AND SECOND PRISMS AND OPTICAL UNIT

(71) Applicant: SEIKO EPSON CORPORATION, Tokyo (JP)

(72) Inventors: Takashi Takeda, Suwa (JP); Mitsutaka Ide, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 272 days.

(21) Appl. No.: 18/757,445

(22) Filed: Jun. 27, 2024

(65) Prior Publication Data

US 2025/0004276 A1 Jan. 2, 2025

(30) Foreign Application Priority Data

Jun. 30, 2023 (JP) ................................ 2023-107970

(51) Int. Cl.

*G02B 27/01* (2006.01)
*G02B 3/12* (2006.01)
*G02B 6/34* (2006.01)

(52) U.S. Cl.

CPC .......... *G02B 27/0172* (2013.01); *G02B 6/34* (2013.01); *G02B 2027/0178* (2013.01)

(58) Field of Classification Search

None

See application file for complete search history.

(56) References Cited

U.S. PATENT DOCUMENTS

| | | | | |
|---|---|---|---|---|
| 2020/0018966 | A1* | 1/2020 | Komatsu | G02B 5/10 |
| 2022/0137413 | A1* | 5/2022 | Ide | G02B 17/0856 359/13 |
| 2022/0171194 | A1* | 6/2022 | Noguchi | G02B 5/003 |
| 2022/0171196 | A1* | 6/2022 | Ide | G02B 27/0172 |

FOREIGN PATENT DOCUMENTS

| | | |
|---|---|---|
| JP | 2020008749 | 1/2020 |

* cited by examiner

*Primary Examiner* — Paul C Lee
(74) *Attorney, Agent, or Firm* — JCIPRNET

(57) ABSTRACT

A virtual image display device includes: a first lens that has a positive refractive power and on which video light is incident from the display element, a first prism on which the video light passed through the first lens is incident, a second prism that is bonded to the first prism, a polarized light separation film that is provided at a bonding site of the first prism and the second prism, a second lens that is disposed facing an outer surface of the first prism, a transmissive mirror that is formed on a convex surface of the second lens, a quarter-wavelength plate disposed between the outer surface and the flat surface of the second lens, and a compensation lens that has a shape obtained by inverting the convex surface of the second lens and that is bonded to the convex surface.

10 Claims, 7 Drawing Sheets

VIRTUAL IMAGE DISPLAY DEVICE COMPRISING A FIRST LENS AND A SECOND LENS HAVING A PLANO-CONVEX SHAPE AND FIRST AND SECOND PRISMS AND OPTICAL UNIT

The present application is based on, and claims priority from JP Application Serial Number 2023-107970, filed Jun. 30, 2023, the disclosure of which is hereby incorporated by reference herein in its entirety.

BACKGROUND

1. Technical Field

The present disclosure relates to a virtual image display device and an optical unit that are a see-through type and that enable observation of a virtual image.

2. Related Art

A known head-mounted display includes a display device, a projection optical member, a prism member, and an optical condensing/reflecting surface, and image light from the projection optical member is incident into a first prism included in the prism member, totally reflected at an outer surface of the prism member, partially reflected at a semi-transmissive reflective surface formed at a boundary between the first prism and a second prism included in the prism member, then transmitted through the outer surface of the prism member, reflected at the condensing/reflecting surface, returned to the prism member, transmitted through the semi-transmissive reflective surface, and further passed through an inner surface facing a pupil (see JP 2020-08749 A).

In the head-mounted display described above, since an intermediate image is formed in the first prism, an optical path length becomes long, and an optical system becomes large as a whole. In addition, since the projection optical member is disposed in a direction inclined toward a face with respect to the above of the prism member, the projection optical member is disposed close to the face and interference is likely to occur, so that the projection optical member is limited in arrangement and size.

SUMMARY

According to an aspect of the present disclosure, there is provided a virtual image display device being a direct virtual image type, the virtual image display device including a display element configured to emit video light, a first lens having a positive refractive power, on which the video light is incident from the display element, a first prism on which the video light passed through the first lens is incident, a second prism bonded to the first prism, the second prism forming a prism light-guiding member having a parallel flat plate shape, a polarized light separation film provided at a bonding site of the first prism and the second prism, the polarized light separation film having a flat surface shape, the polarized light separation film being configured to selectively reflect the video light guided in the first prism in accordance with a polarization direction, a second lens including a flat surface provided facing an outer surface of the first prism, on which the video light reflected at the polarized light separation film is incident, the second lens having a plano-convex shape, a transmissive mirror formed on a convex surface of the second lens, the transmissive mirror being configured to partially reflect the video light reflected at the polarized light separation film toward the polarized light separation film, a quarter-wavelength plate disposed between the outer surface of the first prism and the flat surface of the second lens, the quarter-wavelength plate being for the video light, and a compensation lens including a concave surface having a shape obtained by inverting the convex surface of the second lens, the concave surface being bonded to the convex surface through the transmissive mirror, and a flat surface parallel to the outer surface of the first prism.

According to an aspect of the present disclosure, there is provided an optical unit being a direct virtual image type, the optical unit including a first lens having a positive refractive power, on which video light is incident from a display element configured to emit the video light, a first prism on which the video light passed through the first lens is incident, a second prism bonded to the first prism, the second prism forming a prism light-guiding member having a parallel flat plate shape, a polarized light separation film provided at a bonding site of the first prism and the second prism, the polarized light separation film having a flat surface shape, the polarized light separation film being configured to selectively reflect the video light guided in the first prism in accordance with a polarization direction, a second lens including a flat surface provided facing an outer surface of the first prism, the second lens having a plano-convex shape, on which the video light reflected at the polarized light separation film is incident, a transmissive mirror formed on a convex surface of the second lens, the transmissive mirror being configured to partially reflect the video light reflected at the polarized light separation film toward the polarized light separation film, a quarter-wavelength plate disposed between the outer surface of the first prism and the flat surface of the second lens, the quarter-wavelength plate being for the video light, and a compensation lens including a concave surface having a shape obtained by inverting the convex surface of the second lens, the concave surface being bonded to the convex surface through the transmissive mirror, and a flat surface parallel to the outer surface of the first prism.

DESCRIPTION OF EMBODIMENTS

First Embodiment

A first embodiment of a virtual image display device and the like according to the present disclosure will be described below with reference to FIGS. 1, 2 and the like.

Figure 1:
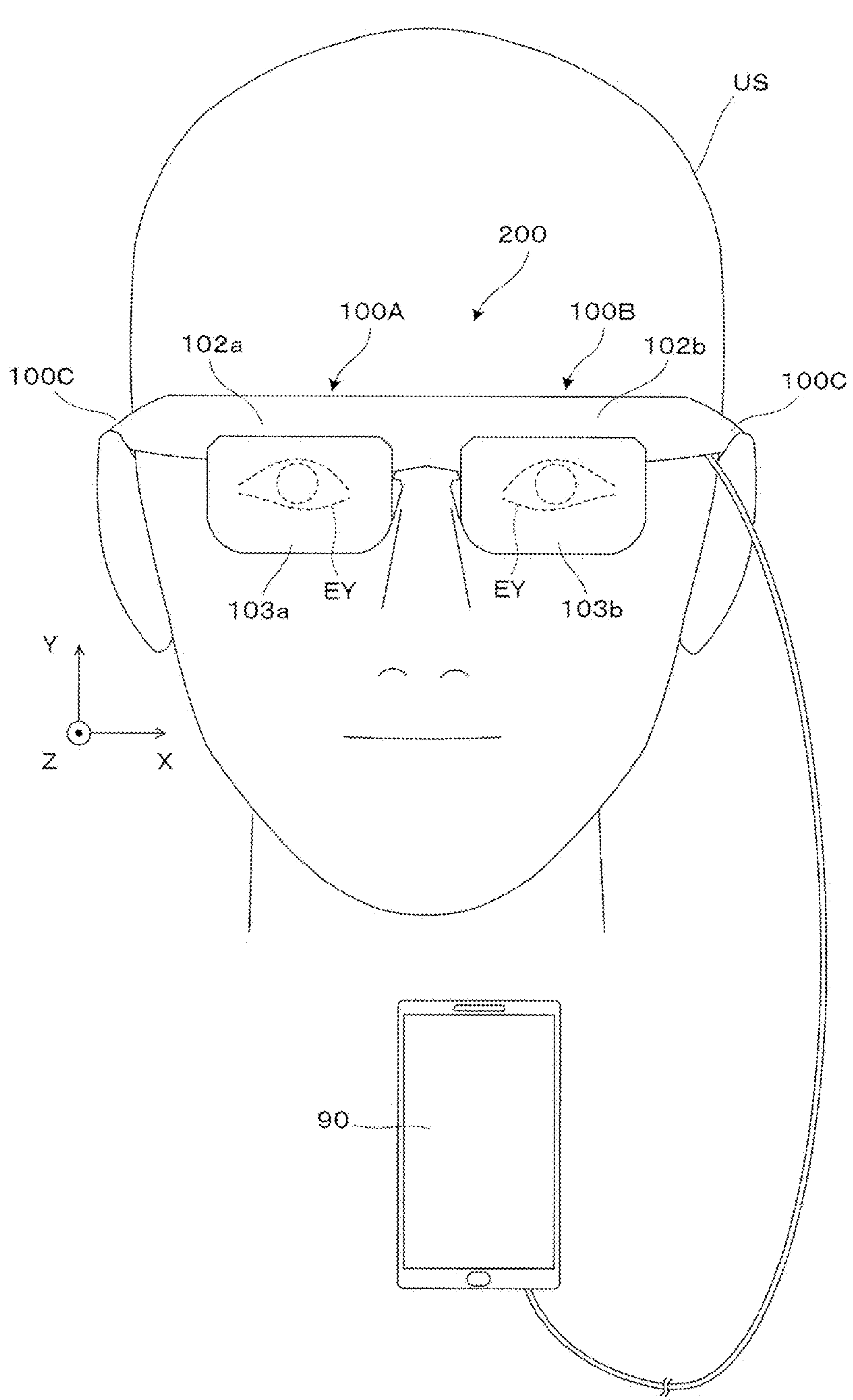
FIG. 1 is an external view for describing a used state of a virtual image display device according to a first embodiment.

FIG. 1 is a diagram for describing a mounted state of a head-mounted virtual image display device (hereinafter, also referred to as a head-mounted display or an "HMD") 200, and the HMD 200 allows an observer or wearer US who is wearing the HMD 200 to recognize a video as a virtual image. In FIG. 1 and the like, X, Y, and Z indicate an orthogonal coordinate system, a +X direction corresponds to a lateral direction in which both eyes EY of the observer or wearer US wearing the HMD 200 are aligned, a +Y direction corresponds to an upward direction orthogonal to the lateral direction in which both the eyes EY are aligned for the wearer US, and a +Z direction corresponds to a forward or front direction for the wearer US. The ±Y directions are parallel to a vertical axis or a vertical direction.

The HMD 200 includes a first virtual image display device 100A that is for a right eye and of a direct virtual image type, a second virtual image display device 100B that is for a left eye and of a direct virtual image type, a pair of support devices 100C that have a temple shape and that support the virtual image display devices 100A and 100B, and a user terminal 90 as an information terminal. The first virtual image display device 100A alone functions as an HMD, and is constituted by a first display driving unit 102*a* disposed at an upper portion thereof, and a first combiner 103*a* that has a spectacle lens shape and that covers a front of the eye. Similarly, the second virtual image display device 100B alone functions as an HMD, and is constituted by a second display driving unit 102*b* disposed at an upper portion thereof, and a second combiner 103*b* that has a spectacle lens shape and that covers a front of the eye. The support devices 100C are mounting members to be mounted on the head of the wearer US, and support upper end sides of the pair of combiners 103*a* and 103*b* by using the display driving units 102*a* and 102*b* that are integrated in appearance. The first virtual image display device 100A and the second virtual image display device 100B are optically identical or inverted to each other in a left-right direction, and detailed description of the second virtual image display device 100B will be omitted.

Figure 2:
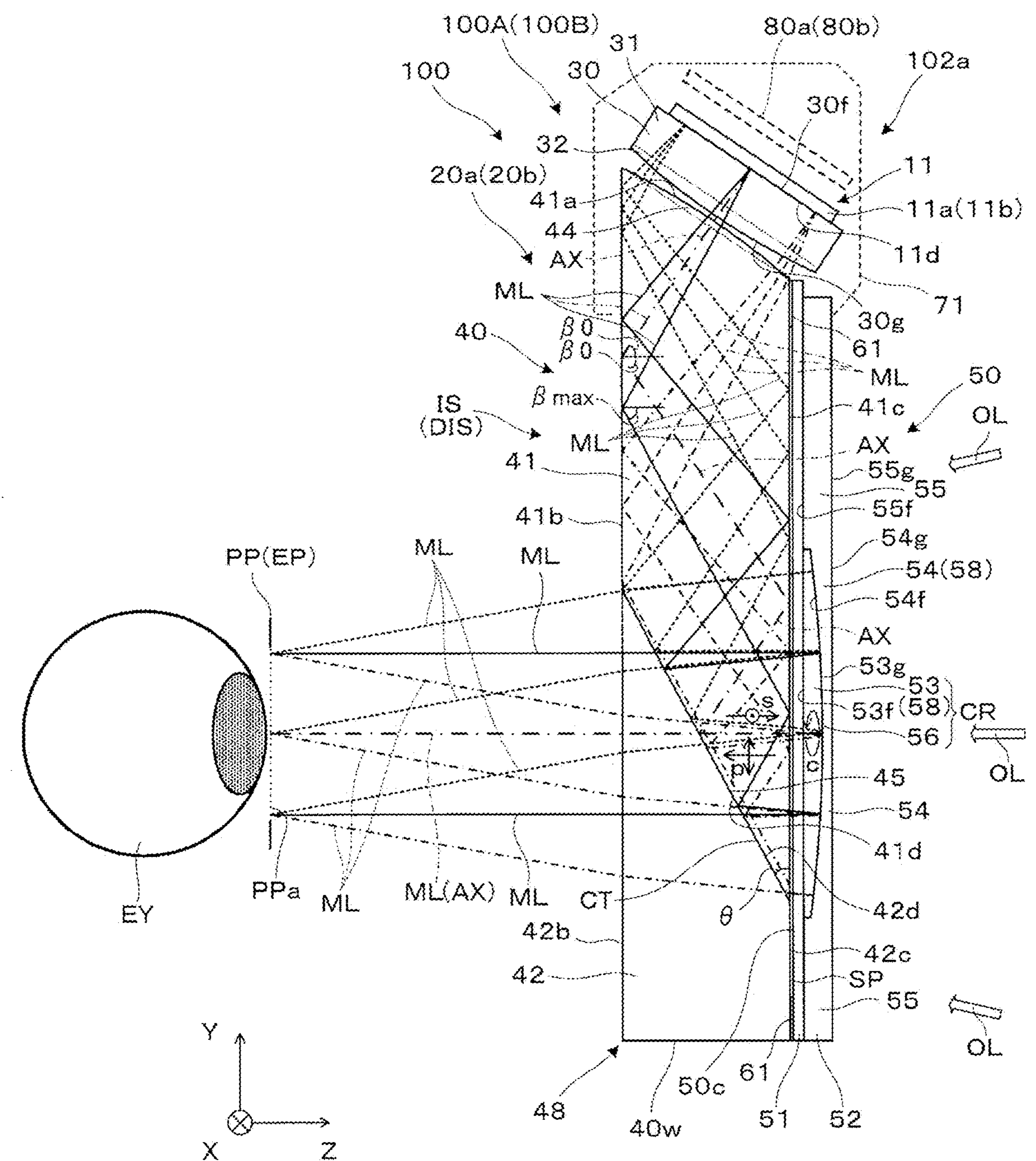
FIG. 2 is a side cross-sectional view for describing an internal structure of a display device on one side.

FIG. 2 is a side cross-sectional view for describing an internal structure of the first virtual image display device 100A. The first virtual image display device 100A includes a first image forming element 11*a*, a first display unit 20*a*, and a first circuit member 80*a*. The first image forming element 11*a* is also referred to as a display element 11. The first display unit 20*a* is an imaging optical system IS that directly forms a virtual image without forming an intermediate image and is also referred to as a direct virtual image optical system DIS. The imaging optical system IS includes a first lens 30, a first flat plate member 40, and a second flat plate member 50. The first lens 30 functions as a protective glass that protects a display surface lid of the display element 11. The first flat plate member 40 guides the video light ML emitted from the display element 11 to a second lens 53 of the second flat plate member 50. The second flat plate member 50 reflects the video light ML toward a pupil position PP or an eye EY by partially returning the video light ML from the first flat plate member 40 to the first flat plate member 40, and causes an external light to be incident at the pupil position PP through the first flat plate member 40. Each of the first lens 30, the first flat plate member 40, and the second flat plate member 50 has a function as a lens having a positive refractive power.

Although detailed description will be omitted, the second virtual image display device 100B includes a second image forming element 11*b*, a second display unit 20*b*, and a second circuit member 80*b*. The second image forming element 11*b* is similar to the first image forming element 11*a*, the second display unit 20*b* is similar to the first display unit 20*a*, and the second circuit member 80*b* is similar to the first circuit member 80*a*.

In the first virtual image display device 100A, the first image forming element 11*a* is an image light generating device of a self-luminous type. The first image forming element 11*a* emits the video light ML to the first flat plate member 40 through the first lens 30. The first image forming element 11*a* is housed in and supported by a case 71. The first image forming element 11*a* is, for example, an organic electro-luminescence (EL) display, and forms a color still image or moving image on the display surface lid that is two-dimensional. The first image forming element 11*a* is driven by the first circuit member 80*a* to perform a display operation. The first image forming element 11*a* is not limited to the organic EL display, and may be replaced with a display device using inorganic EL, an organic LED, an LED array, a laser array, a quantum dot light-emitting element, or the like. The first image forming element 11*a* is not limited to the image light generating device of the self-luminous type, and it may be possible to employ a device including an LCD or other optical modulation elements and illuminating the optical modulation elements using a light source such as backlight to form an image. As for the first image forming element 11*a*, it may be possible to use liquid crystal on silicon (LCOS, LCoS is a registered trademark), a digital micro-mirror device, or the like, instead of the LCD. Note that an optical device obtained by excluding the first circuit member 80*a* from the first virtual image display device 100A is referred to as an optical unit 100. It can also be said that the optical unit 100 includes an optical system of a direct virtual image type and is a portion corresponding to the direct virtual image optical system DIS constituting the first virtual image display device 100A.

The first display unit 20*a* includes the first lens 30, the first flat plate member 40, a polarized light separation film 45, and the second flat plate member 50. In the first display unit 20*a*, the first lens 30 has a positive refractive power, and is incident thereon with the video light ML from the first image forming element 11*a*. The first lens 30 includes a light incident surface 30*f* being a flat surface and bonded to the first image forming element 11*a* and a light emission surface 30*g* being a convex surface. The light emission surface 30*g* is, for example, a spherical surface, but may be an aspherical surface having an axially symmetric shape. The first lens 30 can be considered to be divided into a parallel flat plate 31 and a lens portion 32. Ensuring that a thickness of the parallel flat plate 31 is equal to or larger than a predetermined value causes a foreign matter adhering to a surface of the first lens 30 to become less noticeable. The lens portion 32 is a plano-convex lens having a positive refractive power. In the plano-convex lens, one surface has a flat surface shape and the other surface has a convex surface shape. The first lens 30 is made of fused quartz, for example, and has a relatively low refractive index.

The first flat plate member 40 includes a first prism 41 having a parallel flat plate shape and a second prism 42 having a parallel flat plate shape. The first prism 41 and the second prism 42 are bonded at inclined surfaces 41*d* and 42*d*. The first prism 41 and the second prism 42 bonded to each other is referred to as a prism light-guiding member 48. The prism light-guiding member 48 has an appearance of a parallel flat plate. The polarized light separation film 45 having a flat surface shape is formed on the inclined surface 41*d* formed at the lower side of the first prism 41. A combination of the prism light-guiding member 48 and the second flat plate member 50, which will be described later, corresponds to the first combiner 103*a* in FIG. 1.

The first prism 41 has an outer shape of a quadratic prism shape and includes a trapezoidal vertical cross section. The first prism 41 guides the video light ML, and includes an incident optical surface 41*a*, an inner surface 41*b*, an outer surface 41*c*, and the inclined surface 41*d*. Here, the incident optical surface 41*a* is inclined downward and forward as a whole, and an optical axis passing through the incident optical surface 41*a* extends in a direction between the +Z direction that is forward and the +Y direction that is upward. Accordingly, the first image forming element 11*a* that is the display element 11 can be easily disposed at the further external environment side than the inner surface 41*b*, and an angle at which the video light ML propagates in the first prism 41 (in the first prism 41 or inside the first prism 41) can be adjusted. The incident optical surface 41*a* is a convex surface, for example a spherical surface, but may also be an aspherical surface having an axially symmetric shape. The first prism 41 can be considered to include a lens portion 44 including the incident optical surface 41*a*. The lens portion 44 is a plano-convex lens having a positive refractive power. The inner surface 41*b* and the outer surface 41*c* are parallel to each other, and extend perpendicularly to an optical axis AX between the pupil position PP, and the inner surface 41*b* and the outer surface 41*c*. The inner surface 41*b* and the outer surface 41*c* internally reflect the video light ML (that is, reflect the video light ML at an inner side of an object surface), and in particular, it is desirable that the inner surface 41*b* and the outer surface 41*c* totally reflect the video light ML. Applying hard coating to the inner surface 41*b* can enhance scratch resistance or abrasion resistance. The inclined surface 41*d* is a flat surface. The inclined surface 41*d* forms an acute angle with respect to the outer surface 41*c*. To be specific, the inclined surface 41*d* forms an angle of 25° to 32°. Note that an interval between the optical axis AX passing through the pupil position PP and an upper end of the first lens 30 is about 20 mm. The first prism 41 is formed of a resin material and has a refractive index higher than a refractive index of the first lens 30.

The number of reflections of the video light ML in the first prism 41 is one at the inner surface 41*b*, one at the outer surface 41*c*, and one at the polarized light separation film 45, which will be described later. Setting the number of internal reflections of the video light ML in the first prism 41 to two makes it possible to avoid mixing of light having the different number of reflections in the first prism 41 while increasing the angle of view of the video light ML, and the pupil position PP or an aperture PPa thereof. Since an intermediate image is not formed in the first display unit 20*a* or the imaging optical system IS, the video light ML reflected by the inner surface 41*b* and the outer surface 41*c* is less diverged than the video light ML initially emitted from the first image forming element 11*a*. However, the video light ML is incident on the inner surface 41*b* and the outer surface 41*c* in the diverged state, and the diverged state is maintained.

Similarly to the first prism 41, the second prism 42 has an outer shape of a quadratic prism and a trapezoidal vertical cross section. The second prism 42 transmits the video light ML, and includes an inner surface 42*b*, an outer surface 42*c*, and an inclined surface 42*d*. Here, the inner surface 42*b* and the outer surface 42*c* are parallel to each other and extend perpendicularly to the optical axis AX between the pupil position PP, and the inner surface 42*b* and the outer surface 42*c*. Applying hard coating to the inner surface 42*b* can enhance scratch resistance of the inner surface 42*b*. The second prism 42 is formed of a resin material and has a refractive index equal to a refractive index of the first prism 41.

The polarized light separation film 45 is integrally formed on the inclined surface 41*d* of the first prism 41, and is interposed between the inclined surface 41*d* of the first prism 41 and the inclined surface 42*d* of the second prism 42. A space between the polarized light separation film 45 and the inclined surface 42*d* is filled with an adhesive CT for bonding. The polarized light separation film 45 is formed of a dielectric multilayer film, efficiently reflects the video light ML of s-polarized light s when the video light ML includes the s-polarized light s, and efficiently transmits the video light ML of p-polarized light p when the video light ML includes the p-polarized light p.

When a reflection angle of the video light ML on the optical axis AX in the first prism 41 is $\beta 0$, an inclination angle $\theta$ of the polarized light separation film 45 is equal to or more than $90° - \beta 0$. On the assumption that the polarized light separation film 45 does not obstruct a path of the video light ML, when a maximum reflection angle of the video light ML is $\beta max$, the inclination angle $\theta$ of the polarized light separation film 45 is desirably smaller than $\beta max$. The reflection angle $\beta 0$ of the video light ML corresponds to an angle formed by a normal line of the inner surface 41*b* and the optical axis AX passing through the incident optical surface 41*a*, and is an acute angle. That is, the optical axis AX of the incident optical surface 41*a* extends in a direction forming an angle less than 90° with respect to the normal line of the inner surface 41*b*. The polarized light separation film 45 may be any film that selectively reflects the video light ML in accordance with a polarization direction, and may be, for example, a wire grid type polarizer. The polarized light separation film 45 may be a flat surface to such an extent that the polarized light separation film 45 does not affect imaging. In addition, the polarized light separation film 45 may include a slightly curved surface that is convex or concave to such an extent that the polarized light separation film 45 does not affect imaging. Note that a space between the polarized light separation film 45 and the inclined surface 41*d* may be filled with a transmissive filler instead of the adhesive CT. In this case, the first prism 41 and the second prism 42 may be supported by a support member or the like from the outside to maintain a joined state. Further, the polarized light separation film 45 may be integrally formed on the inclined surface 42*d* of the second prism 42 instead of the inclined surface 41*d* of the first prism 41. Applying hard coating on the surface of the polarized light separation film 45 can enhance scratch resistance or abrasion resistance thereof.

The second flat plate member 50 includes a quarter-wavelength plate 51 having a thin plate shape and a cover member 52. The quarter-wavelength plate 51 is a crystal or the like having an optical axis between the X direction and the Y direction, converts the video light ML of the s-polarized light s reflected by the polarized light separation film 45 into circularly polarized light c, and converts the video light ML of the circularly polarized light c reflected by the cover member 52 into p-polarized light p. The cover member 52 includes the second lens 53 having a plano-convex shape, a compensation lens 54 having a plano-concave shape, a compensation flat plate 55 provided around the compensation lens 54, and a transmissive mirror 56.

The second flat plate member 50 is disposed so as to be separated from the first flat plate member 40 at an interval about from 20 μm to 50 μm. The outer surfaces 41*c* and 42*c* of the first flat plate member 40 and the inner surface 50*c* of the second flat plate member 50 may be slightly curved, and a minute step may be formed at the boundary between the outer surfaces 41*c* and 42*c*. However, by setting the interval between the outer surfaces 41*c* and 42*c* and the inner side surface 50*c* to be equal to or more than 20 μm, more preferably equal to or more than 30 μm, these surfaces can be prevented from being excessively close to each other. On the other hand, by setting the interval between the outer surfaces 41*c* and 42*c* and the inner surface 50*c* to be equal to or less than 50 μm, an increase in thickness of the first combiner 103*a* combining the first flat plate member 40 and the second flat plate member 50 can be avoided. Between each of the outer surfaces 41*c* and 42*c* of the first flat plate member 40 and the inner surface 50*c* of the second flat plate member 50, there is provided a spacer 61 for adjusting the interval between the first flat plate member 40 and the second flat plate member 50 and fixing the first flat plate member 40 and the second flat plate member 50 in a mutually positioned state. The spacer 61 is not provided over the entire periphery of the second flat plate member 50. That is, a gap SP between the first flat plate member 40 and the second flat plate member 50 is not sealed and communicates with the outside.

In the cover member 52, the second lens 53 is thin but has a positive refractive power, and includes a flat surface 53*f* bonded to the quarter-wavelength plate 51 and a convex surface 53*g* facing the compensation lens 54. The convex surface 53*g* is, for example, a spherical surface, but may also be an aspherical surface having an axially symmetric shape. The compensation lens 54 is thin but has a positive refractive power and includes a concave surface 54*f* facing the second lens 53 and a flat surface 54*g*. The compensation flat plate 55 is a parallel flat plate, and includes a pair of flat surfaces 55*f* and 55*g*. Here, the concave surface 54*f* of the compensation flat plate 55 has the same shape as that of the convex surface 53*g* of the second lens 53. The flat surface 54*g* of the compensation lens 54 and the flat surface 55*g* of the compensation flat plate 55 are continuous on the same plane. The transmissive mirror 56 is a thin film formed on the convex surface 53*g* of the second lens 53, and has the same shape as that of the convex surface 53*g*. A combination of the second lens 53 and the transmissive mirror 56 is referred to as an optical condensing/reflecting portion CR.

Each of the second lens 53, the compensation lens 54, and the compensation flat plate 55 is formed of a resin material and has an identical refractive index. The refractive index of the second lens 53 and the like is lower than the refractive index of the first prism 41. The compensation lens 54 and the compensation flat plate 55 are an optical element 58 integrally made of the same resin material. A combination of the second lens 53, the compensation lens 54 and the compensation flat plate 55 functions as a parallel flat plate as a whole. That is, the external light OL incident at a position of the compensation lens 54 or the compensation flat plate 55 passes through the compensation lens 54 or the compensation flat plate 55 without being affected by a lens effect by the compensation lens 54 or the like or a step present at an outer edge of the compensation lens 54. The flat surfaces 54*g* and 55*g* of the compensation lens 54 and the compensation flat plate 55 may be provided with an antireflective film or be subjected to hard coating. The external light OL passed through the compensation flat plate 55 passes through the upper, lower, left, and right sides of the compensation lens 54, and is incident from a peripheral region outside the incident region of the video light ML corresponding to the compensation lens 54, that is, from the compensation flat plate 55. This makes it possible to ensure a wide see-through visual field for an external environment. A visual field range of the external light OL is set to, for example, about 40° in the upward direction and about 40° in the downward direction.

A diameter of the second lens 53 is set to from 20 mm to 25 mm from the viewpoint of securing the angles of view. Note that since a thickness of the first flat plate member 40 or the prism light-guiding member 48 in the Z direction is from 6 mm to 8 mm and distances from the inner surfaces 41*b* and 42*b* of the first flat plate member 40 to the pupil position PP are about from 12 mm to 13 mm, the angle of view (diagonal angle of view) that is an angle range in which the video light ML is incident at the pupil position PP can be set to about 40°.

The transmissive mirror 56 is a half mirror, and partially reflects the video light ML passed through the second lens 53 and partially transmits the external light OL. The transmissive mirror 56 reflects the video light ML that has been reflected at the polarized light separation film 45 of the first flat plate member 40 and then has passed through the quarter-wavelength plate 51, and the second lens 53, toward the pupil position PP. The transmissive mirror 56 is a concave mirror that covers the pupil position PP at which the eye EY or the pupil is disposed, that has a concave shape toward the pupil position PP, and that has a convex shape toward the external environment. The pupil position PP or the aperture PPa thereof is referred to as an eye point or an eye box, and corresponds to an emission pupil EP of the first display unit 20*a*.

The transmissive mirror 56 transmits a part of the external light OL therethrough, which enables see-through view of the external environment, and thus enables a virtual image to be superimposed on an external image. At this time, the external light OL passes through the first flat plate member 40 and the second flat plate member 50, but the flat plate members 40 and 50 do not cause a lens effect on the external light OL. A reflectance of the transmissive mirror 56 for each of the video light ML and the external light OL is set to a value equal to or more than 10% and equal to or less than 50% in an incident angle range of the assumed video light ML from the viewpoint of ensuring a brightness of the video light ML and facilitating see-through observation of the external image. The transmissive mirror 56 is formed of, for example, a dielectric multilayer film constituted by a plurality of dielectric layers each of which has an adjusted film thickness. The transmissive mirror 56 may be a single layer film or a multilayer film of a metal such as Al or Ag. In this case, a film thickness thereof has been adjusted. The transmissive mirror 56 is formed by, for example, lamination using vapor deposition.

In the first virtual image display device 100A, each of the first lens 30, the lens portion 44, the second lens 53, and the transmissive mirror 56 has a positive refractive power and causes divergent light to have a converging tendency. The first lens 30, the lens portion 44, the second lens 53, and the transmissive mirror 56, including a main body of the first prism 41, the second prism 42, and the like, function as an imaging optical system IS or a direct virtual image optical system DIS such as a simple microscope type of microscope that forms an erect image. Thus, a real image formed on the display surface lid of the first image forming element 11*a* can be formed as a virtual image projected to the infinity, for example, or a real image formed on the display surface lid can be formed as a virtual image projected several meters ahead. At this time, adjusting refractive powers of the first lens 30, the lens portion 44, the second lens 53, and the transmissive mirror 56 causes a focal length of the imaging optical system IS to be shortened to achieve a desired magnification rate.

Figure 3:
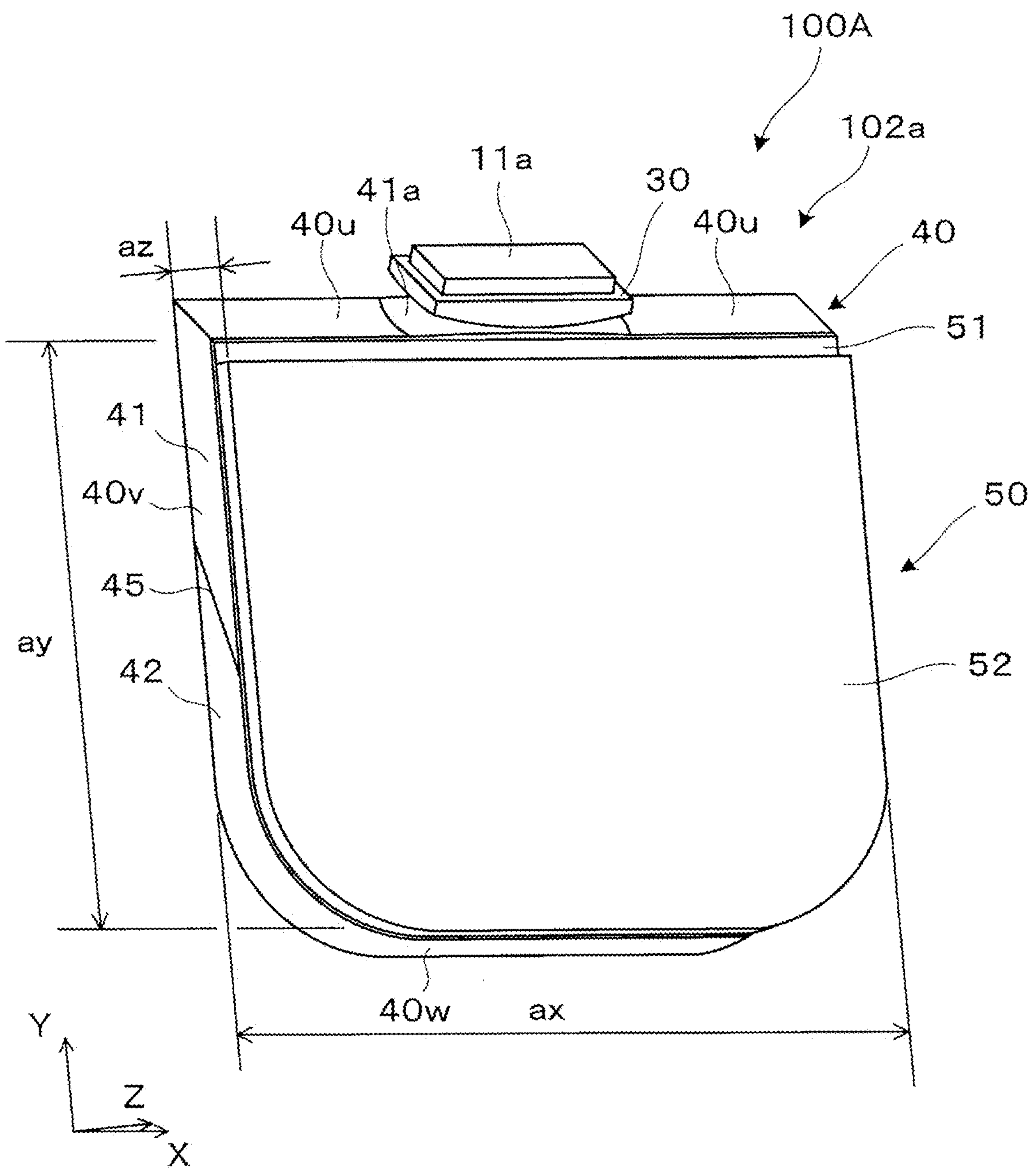
FIG. 3 is a perspective view for describing an external structure of a first display unit.

Referring to FIG. 3, a size ay in the vertical direction of the first flat plate member 40 or the second flat plate member 50 is, for example, 34 mm, and a size ax in the horizontal direction thereof is, for example, 40 mm. A thickness az of the first flat plate member 40 in a front-rear direction is, for example, about 7 mm, and a total thickness of the first flat plate member 40 and the second flat plate member 50 is suppressed to about 7.5 mm. In the first flat plate member 40, upper flat surfaces 40*u* are provided on the left and right sides of the incident optical surface 41*a*. Light is not incident on the upper flat surfaces 40*u*. From the viewpoint of preventing stray light, a light-shielding body (not illustrated) may be disposed on the upper flat surface 40*u* so as to face the upper flat surface 40*u* and to cover the upper flat surface 40*u*, or the light-shielding body may be coated. Side flat surfaces 40*v* and a lower flat surface 40*w* may also be provided with a light-shielding body or the like for covering these surfaces. A light-shielding body or the like covering the periphery of the second flat plate member 50 can also be provided.

Figure 4:
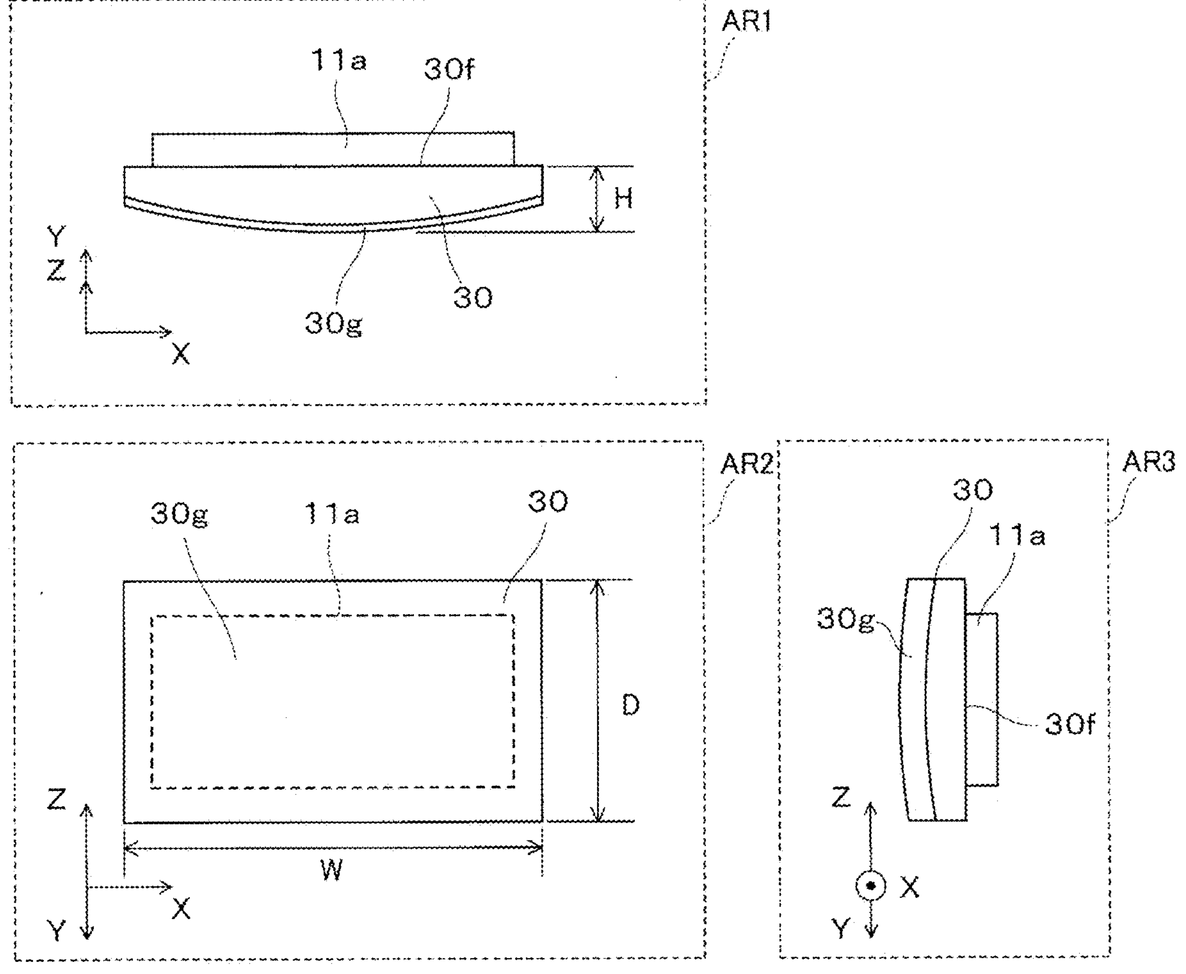
FIG. 4 is a diagram for describing shapes and the like of a first image forming element and a first lens.

With reference to FIG. 4, shapes and the like of the first image forming element 11*a* and the first lens 30 will be described. In FIG. 4, a region AR1 indicates a state in which the first lens 30 and the like are viewed obliquely upward from the +Z side set as the front side, a region AR2 indicates a state in which the first lens 30 and the like are viewed obliquely forward from the −Y side set as the lower side, and a region AR3 indicates a state in which the first lens 30 and the like are viewed from the +X side set as the lateral side. A thickness or height H of the first lens 30 is, for example, approximately 2 mm, a width W of the first lens 30 is, for example, approximately 14 mm, and a depth D of the first lens 30 is, for example, approximately 7 mm.

A curvature radius of the light emission surface 30*g* with a convex shape of the first lens 30 is, for example, 20 mm. In addition, a curvature radius of the incident optical surface 41*a* of the first prism 41 is, for example, 14 mm, and a curvature radius of the transmissive mirror 56 is, for example, 47 mm.

An optical path will be described. The video light ML from the first image forming element 11*a* is incident on the first prism 41 through the first lens 30. At this time, the degree of divergence of the video light ML is suppressed by the positive refractive powers of the first lens 30 and the lens portion 44. In the optical path passing through the first prism 41, the video light ML is sequentially reflected by the inner surface 41*b* of the first prism 41 and the outer surface 41*c* of the first prism 41 without forming an intermediate image, and an s-component of the video light ML is reflected at the polarized light separation film 45. The video light ML of the s-polarized light s reflected at the polarized light separation film 45 is transmitted through the outer surface 41*c* of the first prism 41, is transmitted through the quarter-wavelength plate 51 of the second flat plate member 50 to become circularly polarized light c, and then is incident on the transmissive mirror 56. The video light ML of the circularly polarized light c incident on the transmissive mirror 56 passes through the second lens 53, is partially reflected at the transmissive mirror 56, passes through the second lens 53, and passes through the quarter-wavelength plate 51 again in a collimated state. Accordingly, the video light ML that has passed through the quarter-wavelength plate 51 becomes p-polarized light p, is incident on the first prism 41 from the outer surface 41*c*, is transmitted through the polarized light separation film 45, and is emitted outside the second prism 42 through the inner surface 42*b*. The video light ML emitted outside the second prism 42 is incident at the pupil position PP at which the eye EY or pupil of the wearer US is placed. Not only the video light ML reflected at the transmissive mirror 56 but also the external light OL transmitted through the transmissive mirror 56 and the external light OL passed through the compensation flat plate 55 are incident at the pupil position PP. In other words, the wearer US wearing the first virtual image display device 100A can observe a virtual image of the video light ML superimposed on an external image.

Figure 5:
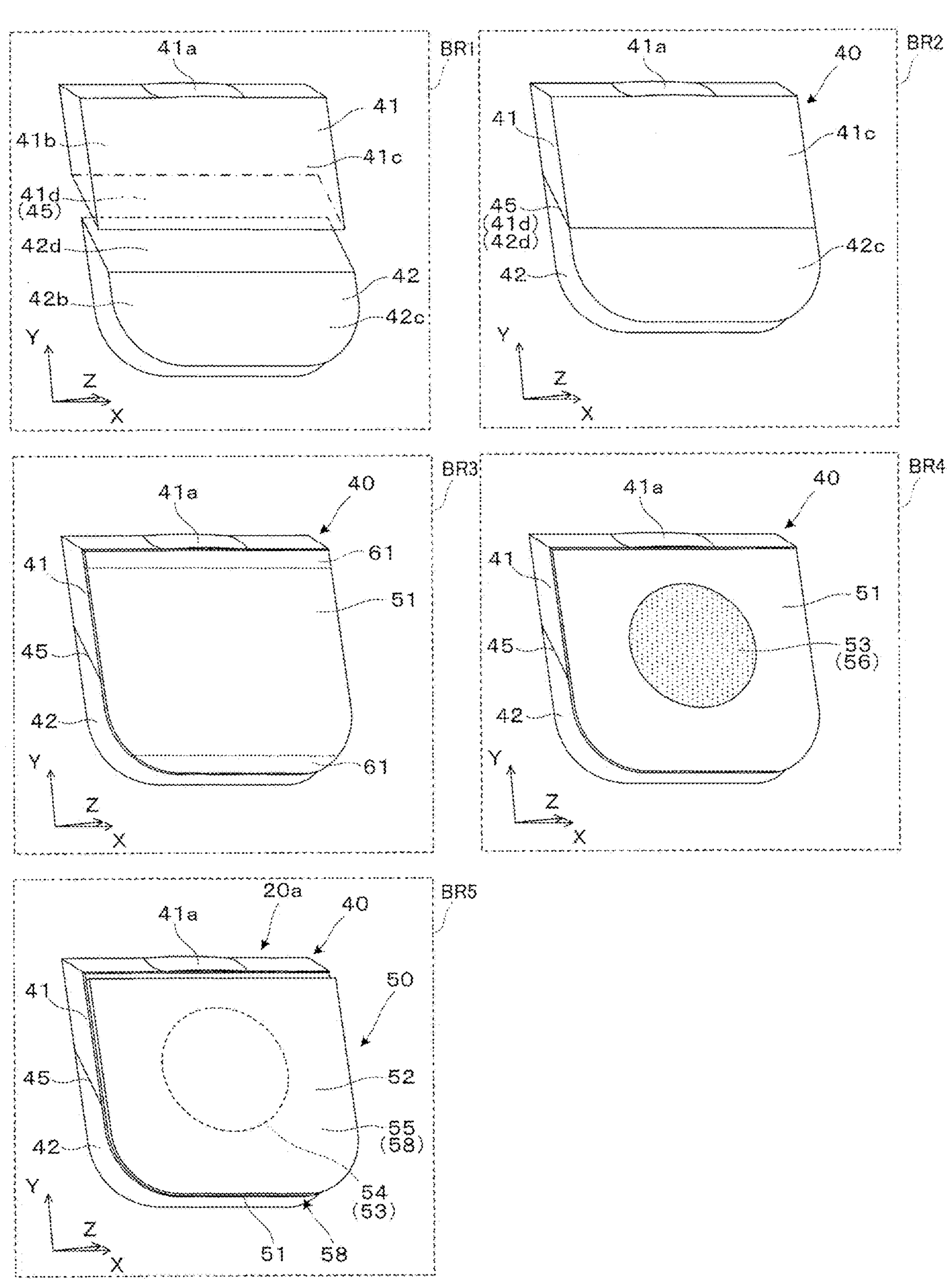
FIG. 5 is a perspective view for describing an example of a structure and assembly of the first display unit.

An example of the structure and assembly of the first display unit 20*a* constituting the first virtual image display device 100A will be described with reference to FIG. 5. In FIG. 5, regions BR1 to BR5 are perspective views for describing an assembly process of the first display unit 20*a*. First, as illustrated in the region BR1, the first prism 41 and the second prism 42 are prepared. The first prism 41 and the second prism 42 are formed by injection molding of resin, for example. The first prism 41 is formed with the incident optical surface 41*a*, the inner surface 41*b*, the outer surface 41*c*, and the like. The second prism 42 is formed with the inner surface 42*b*, the outer surface 42*c*, and the like. Among these, the first prism 41 is formed with the polarized light separation film 45 on the inclined surface 41*d* by vacuum vapor deposition or other methods. As illustrated in the region BR2, the first prism 41 and the second prism 42 are bonded at the inclined surfaces 41*d* and 42*d* to obtain the first flat plate member 40. Next, as illustrated in the region BR3, the quarter-wavelength plate 51 is bonded so as to face the outer surfaces 41*c* and 42*c* of the first flat plate member 40. At this time, a pair of spacers 61 made of thin adhesives are disposed between the outer surfaces 41*c* and 42*c* of the first flat plate member 40 and the quarter-wavelength plate 51, and a gap is formed between the outer surfaces 41*c* and 42*c* of the first flat plate member 40 and the quarter-wavelength plate 51. As illustrated in the region BR4, the second lens 53 is attached to an appropriate position on the surface of the quarter-wavelength plate 51. The transmissive mirror 56 is formed on the surface of the second lens 53. Next, as illustrated in the region BR5, the optical element 58 is bonded to the quarter-wavelength plate 51 and the like. At this time, the compensation lens 54 and the second lens 53 of the optical element 58 are positioned, fitted, and joined to each other. Additionally, the compensation flat plate 55 and the quarter-wavelength plate 51 of the optical element 58 are bonded to each other. By doing this process, the assembly of the first display unit 20*a* is completed.

In the above description, the first display unit 20*a* is produced such that the second flat plate member 50 is assembled on the first flat plate member 40. However, the first flat plate member 40 and the second flat plate member 50 may be separately assembled, and the first flat plate member 40 and the second flat plate member 50 may be finally bonded to each other.

The virtual image display device 100A, 100B or the optical unit 100 according to the first embodiment is, as described above, a direct virtual image type of virtual image display device including the display element 11 configured to emit the video light ML, the first lens 30 having a positive refractive power, on which the video light ML is incident from the display element 11, the first prism 41 on which the video light ML passed through the first lens 30 is incident, the second prism 42 bonded to the first prism 41, the second prism 42 forming the prism light-guiding member 48 having the parallel flat plate shape, the polarized light separation film 45 provided at a bonding site of the first prism 41 and the second prism 42, the polarized light separation film 45 having a flat surface shape, the polarized light separation film 45 being configured to selectively reflect the video light ML guided in the first prism 41 in accordance with a polarization direction, the second lens 53 including the flat surface 53*f* provided facing the outer surface 41*c* of the first prism 41, the second lens 53 having the plano-convex shape, on which the video light ML reflected at the polarized light separation film 45 is incident, the transmissive mirror 56 formed on the convex surface 53*g* of the second lens 53, the transmissive mirror 56 being configured to partially reflect the video light ML reflected at the polarized light separation film 45 toward the polarized light separation film 45, the quarter-wavelength plate 51 disposed between the outer surface 41*c* of the first prism 41 and the flat surface 53*f* of the second lens 53, the quarter-wavelength plate 51 being for the video light ML, and the compensation lens 54 including the concave surface 54*f* having a shape obtained by inverting the convex surface 53*g* of the second lens 53, the concave surface 54*f* being bonded to the convex surface 53*g* through the transmissive mirror 56, and the flat surface 55*g* parallel to the outer surface 41*c* of the first prism 41.

In the virtual image display device 100A, 100B or the optical unit 100, in order to directly form a virtual image without forming an intermediate image, a refractive power is ensured by using the first lens 30, the second lens 53, and the transmissive mirror 56, a magnification rate is ensured while an increase in optical path length is being suppressed, and thus, an increase in size of the optical system can be avoided.

Second Embodiment

A virtual image display device and the like according to a second embodiment will be described below. Note that the virtual image display device according to the second embodiment is obtained by partially modifying the virtual image display device according to the first embodiment, and description of parts in common with those of the virtual image display device according to the first embodiment will be omitted.

Figure 6:
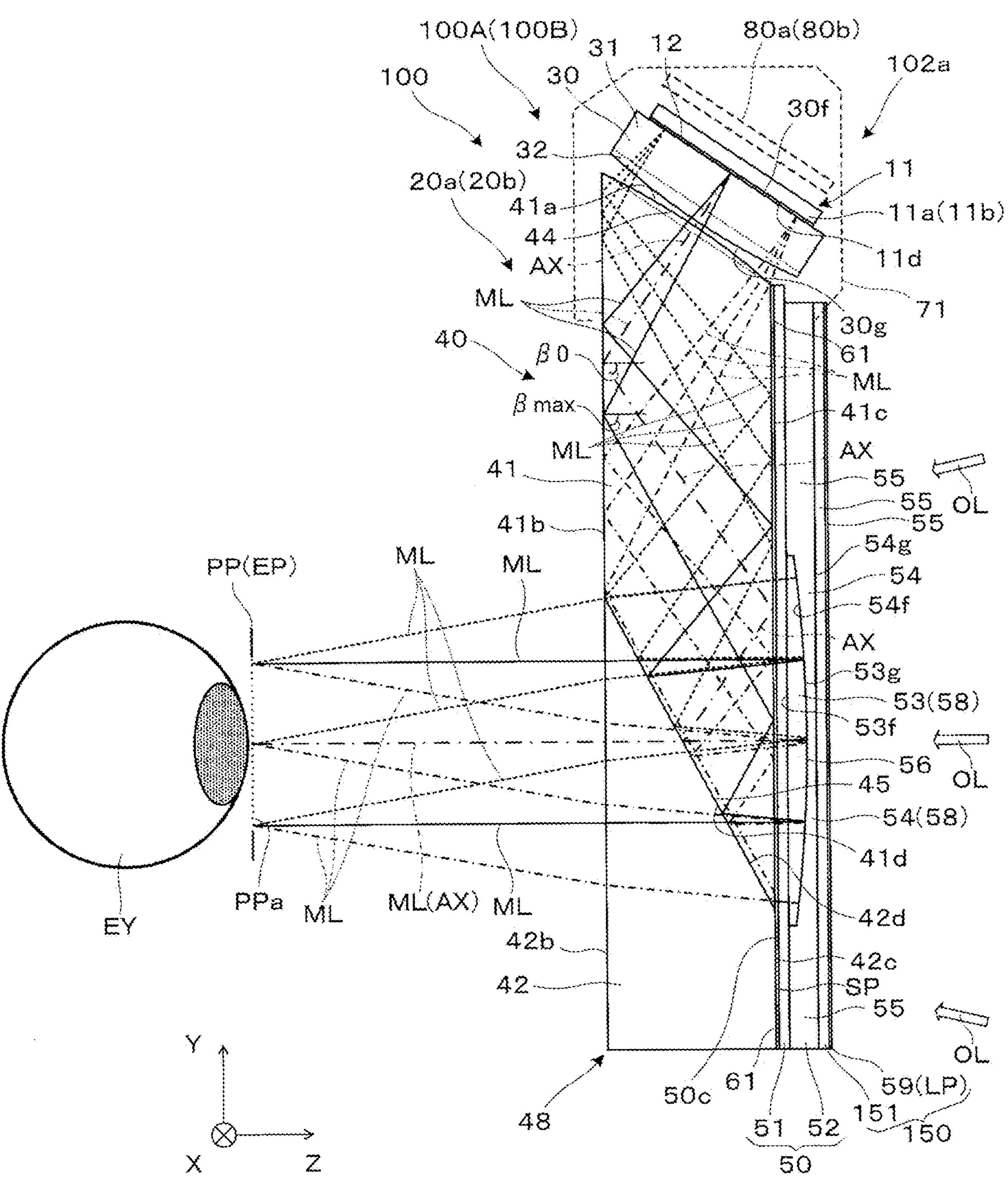
FIG. 6 is a side cross-sectional view for describing a virtual image display device according to a second embodiment.

In the case of the first virtual image display device 100A illustrated in FIG. 6, in the first display unit 20*a*, for example, an s-polarized light transmissive polarizing plate 12 is disposed between the first lens 30 and the first image forming element 11*a*. However, the s-polarized light transmissive polarizing plate 12 is not essential for the function. In addition, in the first display unit 20*a*, a third flat plate member 150 is added to the second flat plate member 50 on an external environment side. The third flat plate member 150 is a video light blocking portion LP and includes the transmissive mirror 56 or a quarter-wavelength plate 151 that is positioned on the outer side and that is provided on the external environment side of the optical condensing/reflecting portion CR and a polarizing plate 59 that is provided on the external environment side of the quarter-wavelength plate 151 positioned on the outer side and that selectively absorbs the video light ML transmitted through the quarter-wavelength plate 151 positioned on the outer side in accordance with the polarization direction. That is, in the first display unit 20*a*, the quarter-wavelength plate 51 positioned on the inner side and the quarter-wavelength plate 151 positioned on the outer side are disposed between the polarized light separation film 45 positioned on the inner side and the polarizing plate 59 positioned on the outer side.

Figure 7:
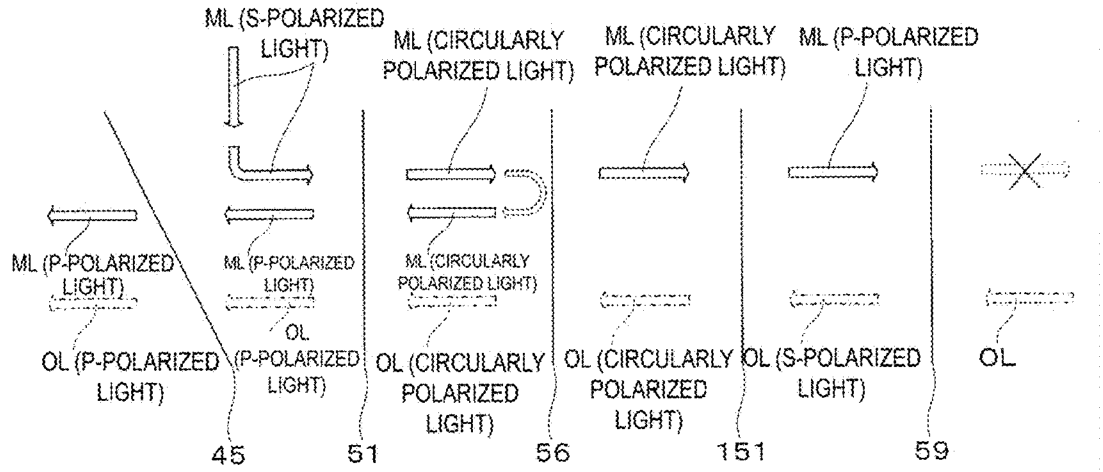
FIG. 7 is a conceptual diagram for describing an operation of the virtual image display device illustrated in FIG. 6.

Referring to FIG. 7, the video light ML from the first image forming element 11*a* (see FIG. 6) includes only s-polarized light, and the video light ML of the s-polarized light incident on the polarized light separation film 45 is reflected at the polarized light separation film 45 without waste, passes through the quarter-wavelength plate 51 positioned on the inner side to become circularly polarized light, and is incident on the transmissive mirror 56. The video light ML of the circularly polarized light incident on the transmissive mirror 56 is partially reflected at the transmissive mirror 56 and passes through the quarter-wavelength plate 51 positioned on the inner side again in the reverse direction. The video light ML passed through the quarter-wavelength plate 51 positioned on the inner side in the reverse direction becomes p-polarized light, passes through the polarized light separation film 45, and is incident at the pupil position PP (see FIG. 6). On the other hand, the video light ML of the circularly polarized light transmitted through the transmissive mirror 56 becomes p-polarized light by passing through the quarter-wavelength plate 151 positioned on the outer side, is incident on the polarizing plate 59, and is mostly blocked by the polarizing plate 59. That is, the video light ML is blocked by the third flat plate member 150 and does not leak to the outside. That is, since the video light ML can be prevented from being observed from the outside, which can ensure privacy.

On the other hand, the external light OL incident on the polarizing plate 59 becomes only s-polarized light by passing through the polarizing plate 59, becomes circularly polarized light by passing through the quarter-wavelength plate 151 positioned on the outer side, and partially passes through the transmissive mirror 56. The external light OL of the circularly polarized light partially transmitted through the transmissive mirror 56 becomes p-polarized light by passing through the quarter-wavelength plate 51 positioned on the inner side, is transmitted through the polarized light separation film 45, and is incident on the pupil position PP (see FIG. 6).

Figure 8:
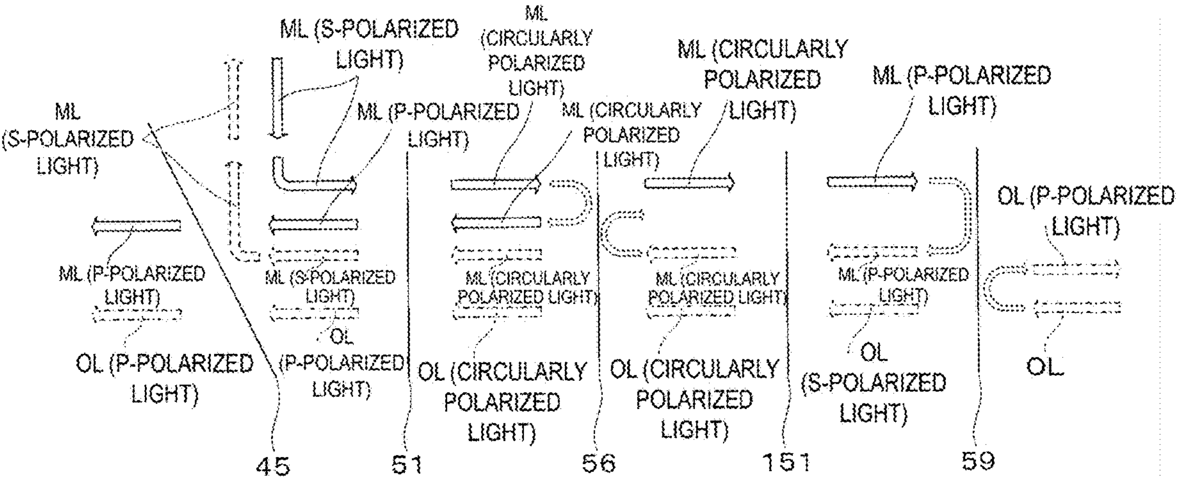
FIG. 8 is a conceptual diagram for describing an operation of a modification of the virtual image display device illustrated in FIG. 6.

FIG. 8 is a diagram for describing a modification of the first virtual image display device 100A illustrated in FIG. 6 and FIG. 7. In this case, it is assumed that the polarizing plate 59 constituting the third flat plate member 150 illustrated in FIG. 6 transmits s-polarized light and reflects p-polarized light.

FIG. 8 is different from FIG. 7 in that the video light ML of circularly polarized light partially transmitted through the transmissive mirror 56 becomes p-polarized light by passing through the quarter-wavelength plate 151 positioned on the outer side, and is mostly reflected at the polarizing plate 59 and does not leak to the outside of the polarizing plate 59. Note that the video light ML of the p-polarized light reflected by the polarizing plate 59 passes through the quarter-wavelength plate 151 positioned on the outer side again in the reverse direction. The video light ML of the p-polarized light passed through the quarter-wavelength plate 51 positioned on the outer side becomes circularly polarized light and is partially reflected by the transmissive mirror 56, but does not pass through the polarizing plate 59. The video light ML of the circularly polarized light partially transmitted through the transmissive mirror 56 passes through the quarter-wavelength plate 51 positioned on the inner side again in the reverse direction. The video light ML passed through the quarter-wavelength plate 51 positioned on the inner side becomes s-polarized light, is reflected at the polarized light separation film 45, and is returned in the direction of the first image forming element 11*a*.

On the other hand, the external light OL incident on the polarizing plate 59 becomes only s-polarized light by passing through the polarizing plate 59, becomes circularly polarized light by passing through the quarter-wavelength plate 151 positioned on the outer side, and partially passes through the transmissive mirror 56. The external light OL of the circularly polarized light partially transmitted through the transmissive mirror 56 becomes p-polarized light by passing through the quarter-wavelength plate 51 positioned on the inner side, is transmitted through the polarized light separation film 45, and is incident on the pupil position PP (see FIG. 6). Note that although the p-polarized light of the external light OL is reflected at the polarizing plate 59, there is no particular problem, and it is rather possible to prevent the surface of the first display unit 20*a* from becoming too dark.

Modifications and Others

Although the present disclosure has been described with reference to the above-described embodiments, the present disclosure is not limited to the above-described embodiments and can be implemented in various modes without departing from the spirit of the disclosure. For example, the following modifications are possible.

Although the HMD 200 includes the first virtual image display device 100A and the second virtual image display device 100B in the above description, the HMD 200 may be configured such that a single virtual image display device of the first virtual image display device 100A or the second virtual image display device 100B is supported in front of the eyes by the support devices 100C.

In the cover member 52, the compensation flat plate 55 can be omitted. In this case, the quarter-wavelength plate 51 is disposed only in the range of the second lens 53, and the second lens 53 is covered with the compensation lens 54.

In the first prism 41 of the first flat plate member 40, the incident optical surface 41*a* may be omitted. In this case, the optical system does not include the lens portion 44.

The first lens 30 is not limited to a lens bonded to the first image forming element 11*a*, and may be a lens disposed separately from the first image forming element 11*a*.

The first image forming element 11*a* may be a scanning-type display device including a laser light source or a scanner mirror.

According to a specific aspect, there is provided a virtual image display device being a direct virtual image type, the virtual image display device including a display element configured to emit video light, a first lens having a positive refractive power, on which the video light is incident from the display element, a first prism on which the video light passed through the first lens is incident, a second prism bonded to the first prism, the second prism forming a prism light-guiding member having a parallel flat plate shape, a polarized light separation film provided at a bonding site of the first prism and the second prism, the polarized light separation film having a flat surface shape, the polarized light separation film being configured to selectively reflect the video light guided in the first prism in accordance with a polarization direction, a second lens including a flat surface provided facing an outer surface of the first prism, the second lens having a plano-convex shape, on which the video light reflected at the polarized light separation film is incident, a transmissive mirror formed on a convex surface of the second lens, the transmissive mirror being configured to partially reflect the video light reflected at the polarized light separation film toward the polarized light separation film, a quarter-wavelength plate disposed between the outer surface of the first prism and the flat surface of the second lens, the quarter-wavelength plate being for the video light, and a compensation lens including a concave surface having a shape obtained by inverting the convex surface of the second lens, the concave surface being bonded to the convex surface through the transmissive mirror, and a flat surface parallel to the outer surface of the first prism.

In the virtual image display device described above, in order to directly form a virtual image without forming an intermediate image, a refractive power is ensured by using the first lens, the second lens, and the transmissive mirror, which makes it possible to ensure a magnification rate while suppressing an increase in length of an optical path and to avoid an increase in size of the optical system.

In the virtual image display device according to the specific aspect, the first lens, the prism light-guiding member, the polarized light separation film, the second lens, the transmissive mirror, and the quarter-wavelength plate constitute an imaging optical system of a simple microscope type configured to form an erect image, and the first prism internally reflects the video light twice while diverging the video light. In this case, a distance from the display element to the transmissive mirror can be easily shortened, the prism light-guiding member can be miniaturized, and the display element and the first lens can also be easily miniaturized.

In the virtual image display device according to the specific aspect, the quarter-wavelength plate being for video light is disposed in a separated manner from the outer surface of the first prism. In this case, internal reflection of the video light at the outer surface of the first prism can be easily ensured.

In the virtual image display device according to the specific aspect, an interval between the quarter-wavelength plate being for the video light and the outer surface of the first prism is from 20 μm to 50 μm.

In the virtual image display device according to the specific aspect, a compensation flat plate provided around the compensation lens, the compensation flat plate extending parallel to the prism light-guiding member obtained by combining the first prism and the second prism, is further provided. In this case, the external light incident on the periphery of the compensation lens can be observed in a manner similar to that of the external light incident into the compensation lens.

In the virtual image display device according to the specific aspect, the first lens includes a light incident surface being a flat surface, the light incident surface being bonded to the display element, and a light emission surface being a convex surface. In this case, the first lens can function as a protective glass, and ensuring a thickness of the first lens to be equal to or larger than a predetermined thickness causes a foreign matter adhering to the surface of the first lens, that is, the convex surface, to be less noticeable.

In the virtual image display device according to the specific aspect, the first prism includes an incident optical surface having a positive refractive power, and the incident optical surface has an optical axis extending in a direction having an angle less than 90° with respect to a normal line of the inner surface. In this case, the display element is easily disposed on the further external environment side than the inner surface, and a situation in which the display element and the like are disposed close to a face and interference is likely to occur can be avoided, and the degree of freedom for the arrangement and size of a projection optical member is enhanced.

In the virtual image display device according to the specific aspect of the present disclosure, the polarized light separation film reflects the video light of s-polarized light, and transmits the video light of p-polarized light obtained by reflecting the video light at the transmissive mirror, and returning the video light through the quarter-wavelength plate.

In the virtual image display device according to the specific aspect, a video light blocking portion including a quarter-wavelength plate positioned on an outer side, the quarter-wavelength plate being provided on an external environment side of the transmissive mirror and a polarizing plate provided on an outer side of the quarter-wavelength plate positioned on the outer side, the polarizing plate being configured to selectively block the video light transmitted through the quarter-wavelength plate positioned on the outer side in accordance with the polarization direction is further provided. In this case, two quarter-wavelength plates are disposed between the polarized light separation film positioned on an inner side and the polarizing plate positioned on the outer side, which makes it possible to prevent the video light from leaking to the external environment side and to prevent video information from being seen from the outside.

According to a specific aspect, there is provided an optical unit being a direct virtual image type, the optical unit including a first lens having a positive refractive power, on which video light is incident from a display element configured to emit the video light, a first prism on which the video light passed through the first lens is incident, a second prism bonded to the first prism, the second prism forming a prism light-guiding member having a parallel flat plate shape, a polarized light separation film provided at a bonding site of the first prism and the second prism, the polarized light separation film having a flat surface shape, the polarized light separation film being configured to selectively reflect the video light guided in the first prism in accordance with a polarization direction, a second lens including a flat surface provided facing an outer surface of the first prism, the second lens having a plano-convex shape, on which the video light reflected at the polarized light separation film is incident, a transmissive mirror formed on a convex surface of the second lens, the transmissive mirror being configured to partially reflect the video light reflected at the polarized light separation film toward the polarized light separation film, a quarter-wavelength plate disposed between the outer surface of the first prism and the flat surface of the second lens, the quarter-wavelength plate being for the video light, and a compensation lens including a concave surface having a shape obtained by inverting the convex surface of the second lens, the concave surface being bonded to the convex surface through the transmissive mirror, and a flat surface parallel to the outer surface of the first prism.

What is claimed is:

1. A virtual image display device being a direct virtual image type, the virtual image display device comprising:

a display element configured to emit video light;

a first lens having a positive refractive power, on which the video light is incident from the display element;

a first prism on which the video light passed through the first lens is incident;

a second prism bonded to the first prism, the second prism forming a prism light-guiding member having a parallel flat plate shape;

a polarized light separation film provided at a bonding site of the first prism and the second prism, the polarized light separation film having a flat surface shape, the polarized light separation film being configured to selectively reflect the video light guided in the first prism in accordance with a polarization direction;

a second lens including a flat surface provided facing an outer surface of the first prism, the second lens having a plano-convex shape, on which the video light reflected at the polarized light separation film is incident;

a transmissive mirror formed on a convex surface of the second lens, the transmissive mirror being configured to partially reflect the video light reflected at the polarized light separation film toward the polarized light separation film;

a quarter-wavelength plate disposed between the outer surface of the first prism and the flat surface of the second lens, the quarter-wavelength plate being for the video light; and a compensation lens including a concave surface having a shape obtained by inverting the convex surface of the second lens, the concave surface being bonded to the convex surface through the transmissive mirror, and a flat surface parallel to the outer surface of the first prism.

2. The virtual image display device according to claim 1, wherein the first lens, the prism light-guiding member, the polarized light separation film, the second lens, the transmissive mirror, and the quarter-wavelength plate constitute an imaging optical system of a simple microscope type configured to form an erect image, and the first prism internally reflects the video light twice while diverging the video light.

3. The virtual image display device according to claim 1, wherein the quarter-wavelength plate being for the video light is disposed in a separated manner from the outer surface of the first prism.

4. The virtual image display device according to claim 3, wherein an interval between the quarter-wavelength plate being for the video light and the outer surface of the first prism is from 20 μm to 50 μm.

5. The virtual image display device according to claim 1, further comprising:

a compensation flat plate provided around the compensation lens, the compensation flat plate extending parallel to the prism light-guiding member obtained by combining the first prism and the second prism.

6. The virtual image display device according to claim 1, wherein the first lens includes a light incident surface being a flat surface, the light incident surface being bonded to the display element, and a light emission surface being a convex surface.

7. The virtual image display device according to claim 1, wherein the first prism includes an incident optical surface having a positive refractive power, and the incident optical surface has an optical axis extending in a direction having an angle less than 90° with respect to a normal line of the inner surface.

8. The virtual image display device according to claim 1, wherein the polarized light separation film reflects the video light of s-polarized light, and transmits the video light of p-polarized light obtained by reflecting the video light at the transmissive mirror, and returning the video light through the quarter-wavelength plate.

9. The virtual image display device according to claim 1, further comprising:

a video light blocking portion including a quarter-wavelength plate positioned on an outer side, the quarter-wavelength plate being provided on an external environment side of the transmissive mirror; and a polarizing plate provided on an outer side of the quarter-wavelength plate positioned on the outer side, the polarizing plate being configured to selectively block the video light transmitted through the quarter-wavelength plate positioned on the outer side in accordance with the polarization direction.

10. An optical unit being a direct virtual image type, the optical unit comprising:

a first lens having a positive refractive power, on which video light is incident from a display element configured to emit the video light;

a first prism on which the video light passed through the first lens is incident;

a second prism bonded to the first prism, the second prism forming a prism light-guiding member having a parallel flat plate shape;

a polarized light separation film provided at a bonding site of the first prism and the second prism, the polarized light separation film having a flat surface shape, the polarized light separation film being configured to selectively reflect the video light guided in the first prism in accordance with a polarization direction;

a second lens including a flat surface provided facing an outer surface of the first prism, the second lens having a plano-convex shape, on which the video light reflected at the polarized light separation film is incident;

a transmissive mirror formed on a convex surface of the second lens, the transmissive mirror being configured to partially reflect the video light reflected at the polarized light separation film toward the polarized light separation film;

a quarter-wavelength plate disposed between the outer surface of the first prism and the flat surface of the second lens, the quarter-wavelength plate being for the video light; and a compensation lens including a concave surface having a shape obtained by inverting the convex surface of the second lens, the concave surface being bonded to the convex surface through the transmissive mirror, and a flat surface parallel to the outer surface of the first prism.

* * * * *